US012658007B2

(12) United States Patent
Williams et al.

(10) Patent No.: US 12,658,007 B2
(45) Date of Patent: Jun. 16, 2026

(54) SYSTEM, METHOD AND INTERFACE FOR PLAYING AN ONLINE POKER GAME UTILIZING ARTIFICIAL INTELLIGENCE TECHNOLOGY

(71) Applicants:Robert Williams, Sliema (MT); John Caldwell, Dana Point, CA (US)

(72) Inventors: Robert Williams, Sliema (MT); John Caldwell, Dana Point, CA (US)

(73) Assignee: I3MARKETING, INC. (CA)

( * ) Notice: Subject to any disclaimer, the term of this patent is extended or adjusted under 35 U.S.C. 154(b) by 217 days.

(21) Appl. No.: 18/340,766

(22) Filed: Jun. 23, 2023

(65) Prior Publication Data

US 2023/0419792 A1 Dec. 28, 2023

Related U.S. Application Data

(60) Provisional application No. 63/366,893, filed on Jun. 23, 2022.

(51) Int. Cl.
*G07F 17/32* (2006.01)
*H04L 9/00* (2022.01)

(52) U.S. Cl.
CPC ...... *G07F 17/3293* (2013.01); *G07F 17/3276* (2013.01); *H04L 9/50* (2022.05)

(58) Field of Classification Search
CPC ............. G07F 17/3293; G07F 17/3276; G07F 17/3211; H04L 9/50; H04L 2209/56
USPC ................................. 463/13, 12, 11
See application file for complete search history.

(56) References Cited

U.S. PATENT DOCUMENTS

| | | | | |
|---|---|---|---|---|
| 10,026,265 | B1 * | 7/2018 | Billings | ............. G07F 17/3244 |
| 10,322,333 | B1 * | 6/2019 | Reeves | ................ G07F 17/326 |
| 2008/0139305 | A1 * | 6/2008 | Vallejo | ............... G07F 17/3258 |
| | | | | 463/42 |
| 2012/0123570 | A1 * | 5/2012 | Guinn | .................... G07F 17/32 |
| | | | | 700/91 |
| 2012/0214566 | A1 * | 8/2012 | Suttle | ................. G07F 17/3258 |
| | | | | 463/13 |
| 2018/0012455 | A1 * | 1/2018 | Costa | .................. G07F 17/3293 |
| 2019/0066431 | A1 * | 2/2019 | Waxman | ............ G07F 17/3293 |
| 2021/0123570 | A1 | 4/2021 | Chen et al. | |
| 2023/0419792 | A1 * | 12/2023 | Williams | ................. H04L 9/50 |

OTHER PUBLICATIONS

PCT International Preliminary Report on Patentability for PCT/US2023/068939 (8 pages).

* cited by examiner

*Primary Examiner* — Pierre E Elisca
(74) *Attorney, Agent, or Firm* — FisherBroyles, LLP; Rob L. Phillips

(57) ABSTRACT

A system and method involving the use of poker bots to play poker games. In one version, poker tournaments are separated into a first "pre-bubble" stage and a second "in-the-money" stage. The pre-bubble stage lasts until each of the remaining players is eligible to win an award (e.g., if the tournament has 100 players, the pre-bubble stage may last until 10 players remain). The in-the-money stage continues from the end of the pre-bubble stage until the conclusion of the poker tournament. During the pre-bubble stage, poker bots control all play. During the in-the-money stage, players may use their bots or override their bots on a hand-by-hand basis.

26 Claims, 6 Drawing Sheets

400

410

SYSTEM, METHOD AND INTERFACE FOR PLAYING AN ONLINE POKER GAME UTILIZING ARTIFICIAL INTELLIGENCE TECHNOLOGY

CROSS-REFERENCE

This application claims priority to U.S. Patent Application No. 63/366,893 filed Jun. 23, 2022 which is incorporated herein for all purposes.

FIELD OF THE INVENTION

The embodiments of the present invention relate to a system, method and interface for conducting an online poker game. Each player may utilize artificial intelligence to assist as desired in the manner prescribed herein.

BACKGROUND

Online poker has been played since the late 1990's but its popularity exploded between 2003 and 2006. The catalyst of the "poker boom" was Chris Moneymaker who won his entry to the 2003 World Series of Poker through an $86 satellite buy-in. He went on to win $2.5M in the main event, causing shock in the poker world and beginning the poker boom.

The 2004 World Series of Poker main event featured three times the number of players as the 2003 World Series main event. At least four players at the 2004 WSOP final table won their entry through an online card room. Like Moneymaker, 2004 winner Greg Raymer also won his entry at the PokerStars online card room. Since the inception of online poker rooms, more than 100 million players have deposited money to play online poker, but today only a small percentage of those players remain active.

One of the primary reasons for the decrease in the number of online poker players is that online poker can be exploited by players using sophisticated technological tools and artificial intelligence to gain an advantage over unsuspecting players.

The embodiments of the present invention resolve such exploitation and are intended to level the playing field and attract players to the online poker rooms once again.

SUMMARY

In one embodiment of the present invention, a method allows players to use artificial intelligence (aka bots). Each player may select a specific bot to assist with playing the poker game. Different bots have different attributes and play styles. In one embodiment, the playing styles of the bots are integrated into non-fungible tokens (NFTs).

In one embodiment, poker tournaments are separated into a first "pre-bubble" stage and the second "in-the-money" stage. The pre-bubble stage lasts until each of the remaining players is eligible to win an award (e.g., if the tournament has 100 players, the pre-bubble stage may last until players remain). The in-the-money stage continues from the end of the pre-bubble stage until the conclusion of the poker tournament. In one embodiment, during the pre-bubble stage, the bots exclusively control all play of the poker game. During the pre-bubble stage, players observe play through an immersive interface. During the in-the-money stage, players have the option to use their bots or override their bots on a hand-by-hand basis.

In one embodiment, a toggle switch depicted on the interface provides means for the players to switch between bot play and human play. The toggle switch remains inactive during play of the poker hand and active between play of successive poker hands.

Other variations, embodiments and features of the present invention will become evident from the following detailed description, drawings and claims.

DETAILED DESCRIPTION

Figure 1:
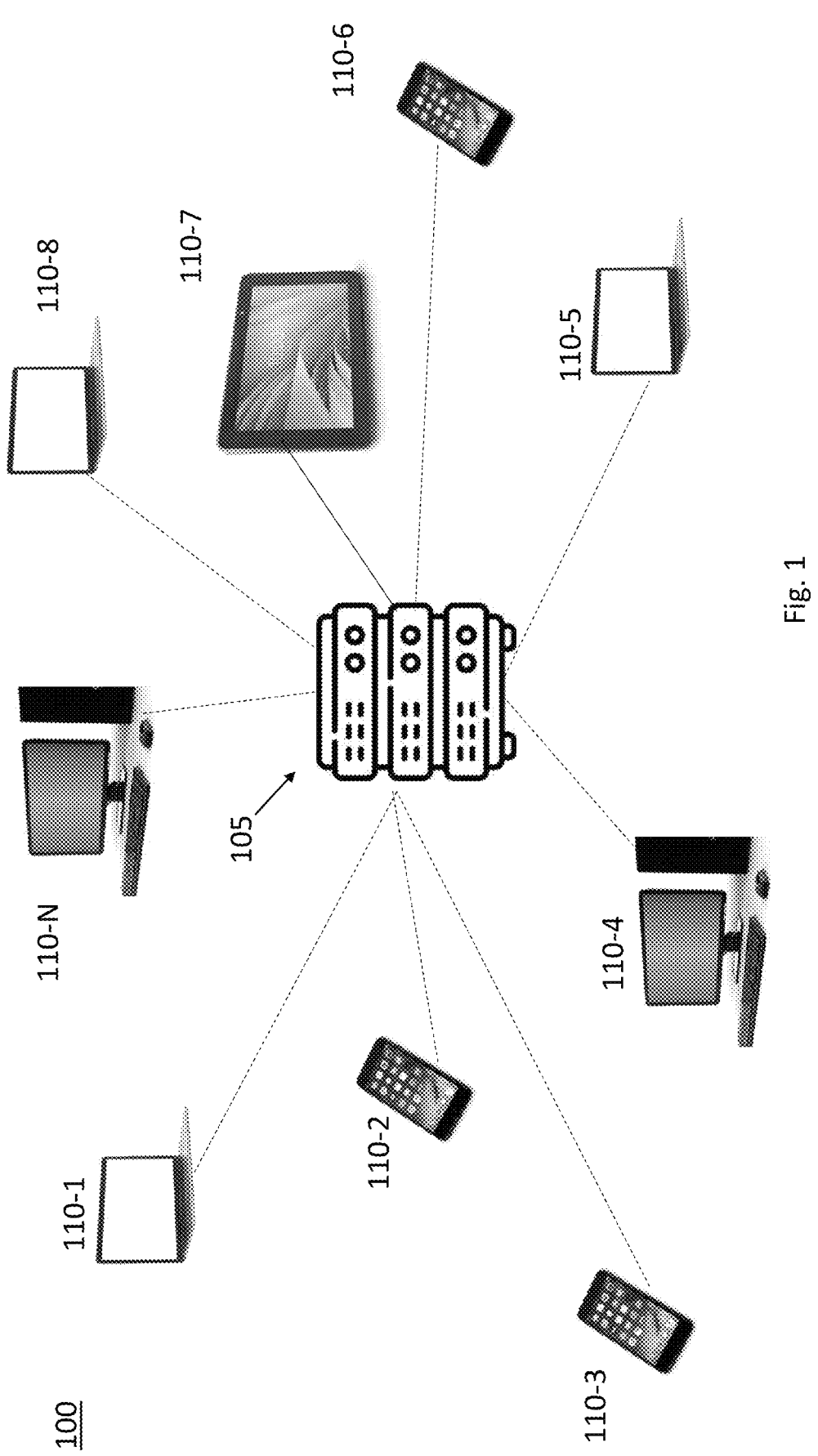
FIG. 1 illustrates a schematic of a system for conducting online poker games.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" or "gaming device" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention are facilitated by a network of computer devices, including cell phones, tablets, laptops, desktops, etc. FIG. 1 shows such a network 100 comprising a server 105 and plurality of computer devices 110-1 through 110-N. While not shown, the network 100 may further include routers, switches and other hardware and software components known to those skilled in the art. The server 105 incudes one or more processors running poker software according to the embodiments of the present invention. The computer devices 110-1 through 110-N communicate with the server 105 via wireless and/or wired connections. Each computer device 105-1 through 105-N includes a display for presenting the online poker game to the user of each such device. As known to those skilled in the art, the server 105 and software running thereon along with the computer devices 110-1 through 110-N facilitate play of poker games involving remotely-located players.

Those skilled in the art will recognize how online poker websites operate and function. Consequently, this detailed description focuses on improvements to the operation and function of current online poker websites (e.g., PokerStars). One primary problem that has arisen during the maturation of online poker is the use of bots to assist certain players unbeknownst to other players at the poker table. The use of bots creates an obvious advantage for those players choosing to use them. The embodiments of the present invention seek to reduce or eliminate that advantage.

The detailed description below focuses on poker tournaments, but cash games may also benefit from the embodiments of the present invention. Poker tournaments involve a plurality of players paying an entry fee from which payouts are funded and operators are compensated. Normally, the top ten percent of finishers entering the tournament are eligible for a payout with the winner receiving the largest payout, the second place finisher receiving the second highest payout and so on. Different payout schemes can be implemented without departing from the scope and spirit of the embodiments of the present invention. Players finishing near the payout threshold are said to have finished on the bubble. The embodiments of the present invention may be used with all poker games, such as Texas Hold'em, Razz, Seven Card Stud, Omaha, etc.

The current future of online poker is uncertain. Automated bots are being used by many players creating unfair advantages for certain players. Bots are computer programs designed to play poker without human oversight. Unlike human players, bots never go on tilt, misplay hands or get tired. With online players being remote from one another, it is difficult to identify when a player is relying on a bot. The embodiments of the present invention seek to overcome the drawbacks of secret bots in favor of openly utilizing bots under certain situations pursuant to rules applicable to all players.

Figure 2:
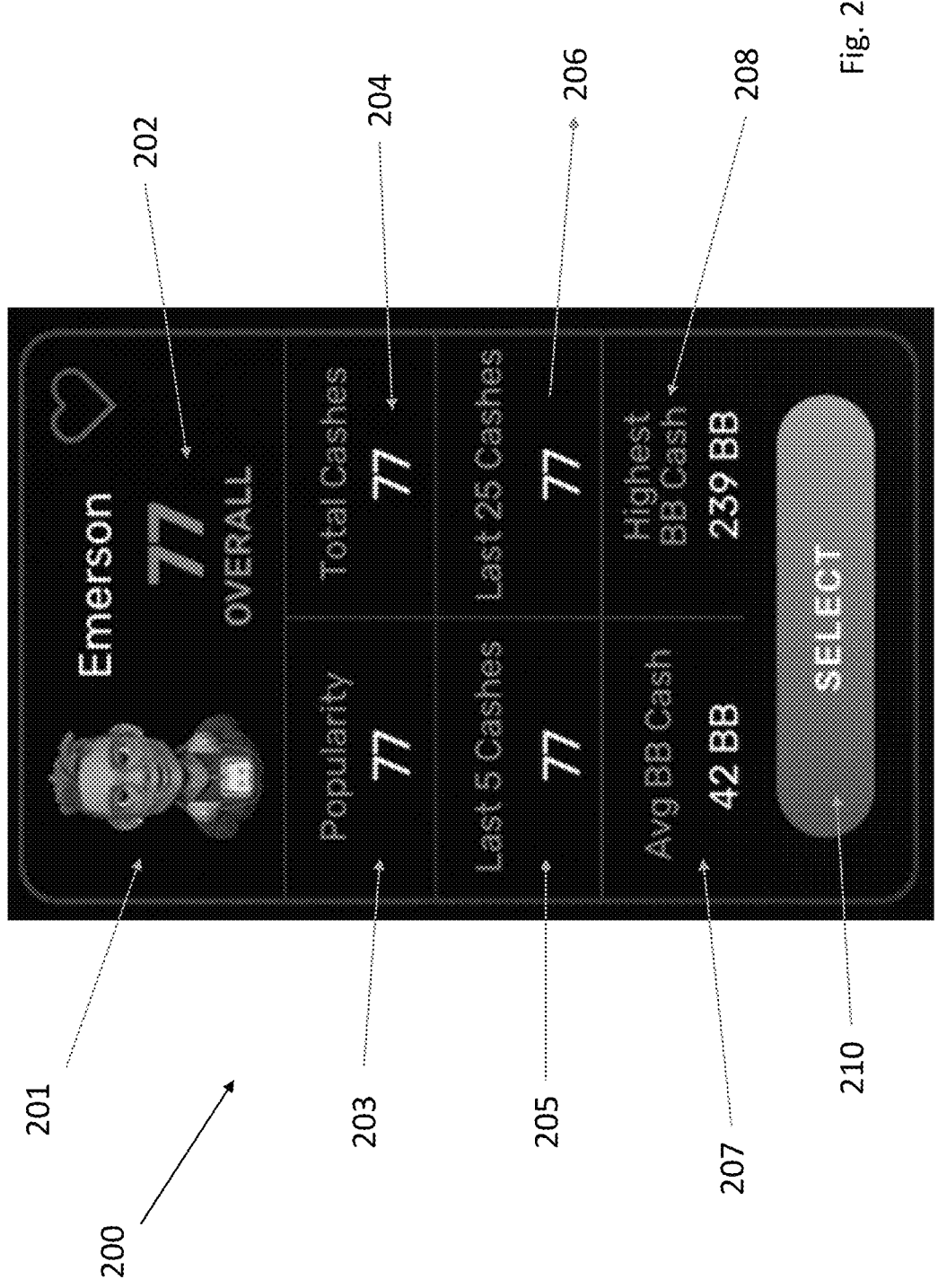
FIG. 2 illustrates a profile of one bot of the type that players may use according to the embodiments of the present invention.

FIG. 2 shows an exemplary poker bot 200 of the type available with the embodiments of the present invention. Each available poker bot 200 includes a name/avatar 201, rank 202, popularity 203, total cashes 204, last 5 cashes 205, last 25 cashes 206, average cash 207 and largest cash 208. A select icon 210 allows a player to choose the poker bot 200. In practice, via a user interface, players select a preferred poker bot from a pool of poker bots. Depending on the embodiment, the same poker bot may be selected by multiple different players. Alternatively, the pool of poker bots is large enough so that each player selects his or her own unique poker bot. In another embodiment, players may select multiple poker bots to use during a poker tournament. In another embodiment, players are randomly assigned one or more poker bots.

Depending on the embodiment, the bots have different sets of attributes with the data built into non-fungible tokens (NFT) or stored in databases. A NFT is a unique digital identifier that is recorded on a blockchain, and is used to certify ownership and authenticity. A NFT cannot be copied, substituted, or subdivided. The ownership of the NFT is recorded in the blockchain and can be transferred by the owner, allowing NFTs to be sold and traded. In this manner, each poker player may own one more poker bots that may be traded or sold.

In one embodiment, the poker bots forming the pool of poker bots stem from one master playing file and incorporate slight individual tweaks and randomizers that make them modestly unique. In one embodiment, the hots must be talented enough not to be exploitable but not too talented they beat the average player.

Figure 3:
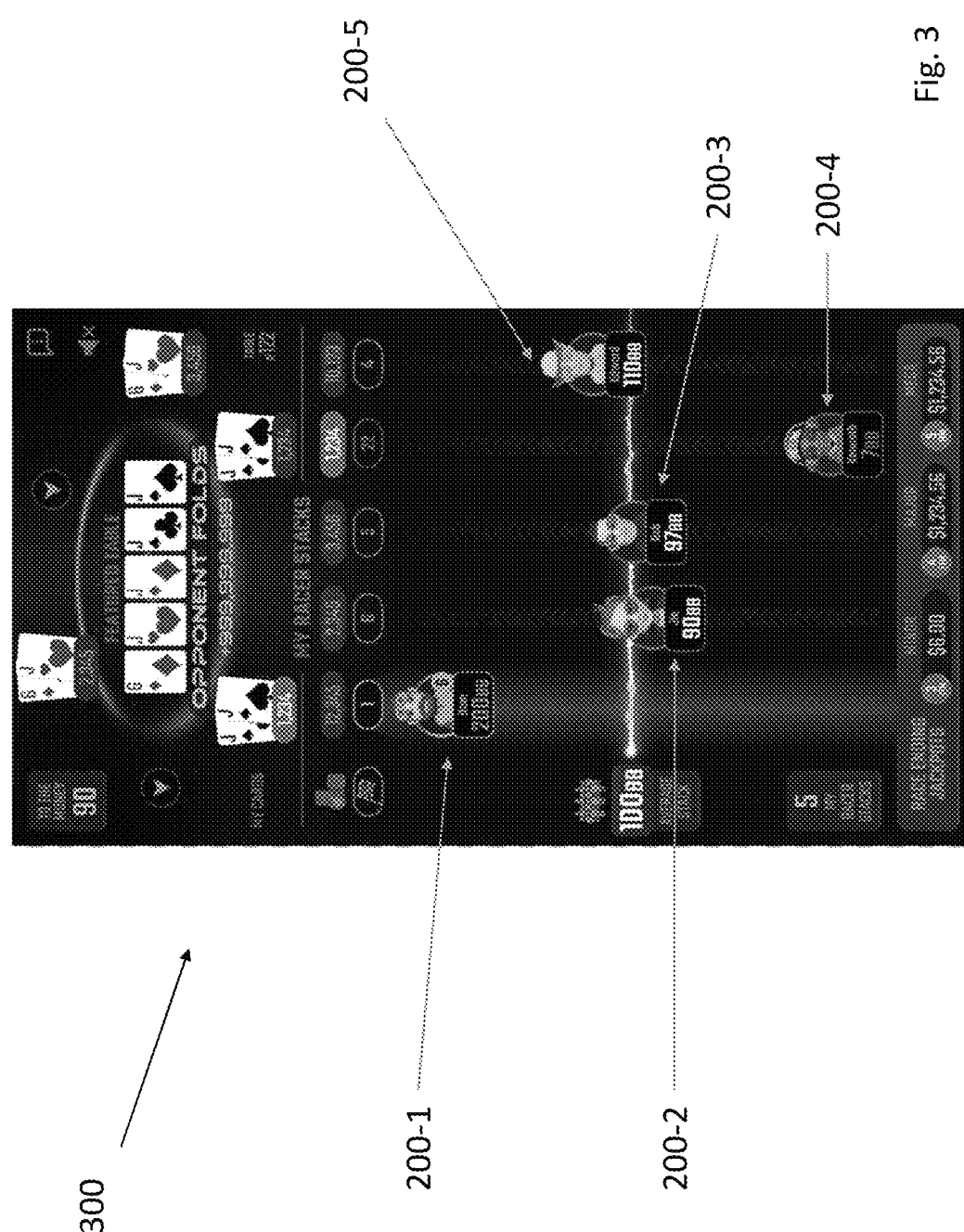
FIG. 3 illustrates poker race elements according to the embodiments of the present invention.

In one embodiment, once all players have selected their poker bots, the poker tournament begins with the poker bots playing all hands. At this stage, the physical players are watching as their poker bots play the poker hands. In one embodiment, the speed of the poker hands is much faster (i.e., no meaningful decision time needed) than if human players were playing such that players monitor the action. FIG. 3 shows a screen shot 300 of an exemplary representation of poker bot play in a race view. The screen shot 300 shows each poker bot 200-1 through 200-5 and its chip stack based on a number of big blinds. An average chip stack is shown as a dynamic horizontal line 210 that updates as player's are eliminated. Each player may follow the status of his or her poker bot by watching a similar race view interface associated with each poker table. As players are moved or re-assigned to different poker tables responsive to players being eliminated, the interface updates automatically so that the player observes the status of his or her poker bot at the new poker table. The pre-bubble stage may occur very quickly (e.g., minutes) rather than hours when human players make the decisions.

In one embodiment, poker bot play continues throughout the pre-bubble stage. That is, during play before the payouts are to begin. For example, if 100 players enter a tournament and payouts are scheduled for the top 10 finishers, poker bot play continues until 90 players are eliminated from, and 10 players remain, in the tournament. Those skilled in the art will recognize that poker bot play may terminate sooner or later.

Figure 4:
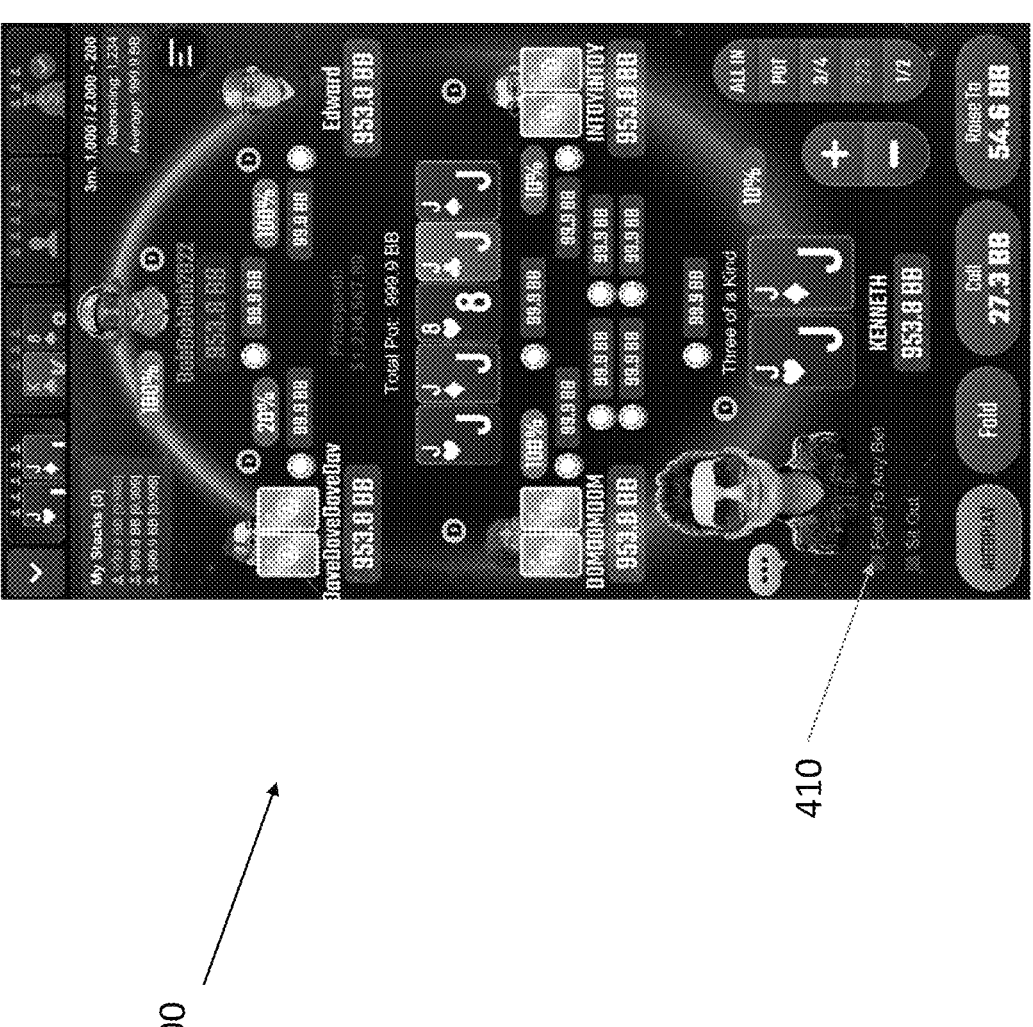
FIG. 4 illustrates an exemplary poker game display according the embodiments of the present invention.
Figure 5:
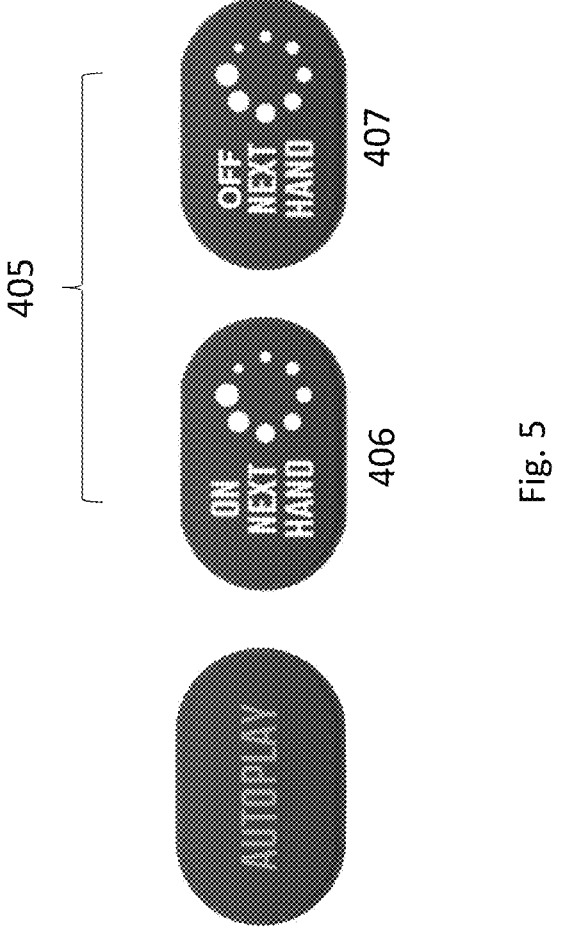
FIG. 5 illustrates an exemplary toggle switch according to the embodiments of the present invention.

In the embodiment, once the pre-bubble stage ends and the in-the-money stage begins, poker bot play becomes optional, on a hand-by-hand basis, at the discretion of the player. FIG. 4 shows a poker game interface 400 during the in-the-money stage of the poker tournament. FIG. 5 shows an exemplary toggle 405 comprising an On button 406 and Off button 407. The On button 406 and Off button 407 are active between hands. In one embodiment, the player has a pre-established amount of time to select whether or not to use the poker bot. In one embodiment, if the time expires before the player makes a selection, the poker bot plays the hand. In another embodiment, if the time expires before the player makes a selection, the player plays the hand. In another embodiment, if the time expires before the player makes a selection, a random generator makes a selection between the On button 406 and Off button 407. An auto-play button 408 allows the player to select the poker bot to play all hands forthcoming hands during the in-the-money stage until such time as the player elects otherwise. In another embodiment, the number of times a player may use their poker bot during the in-the-money stage is limited (e.g., 10 times). Thereafter, the player must play his or her own hands. In another embodiment, the players may only use their poker bots a limited number of times per tournament level during the in-the-money stage. In another embodiment, poker bots may not be used at a final table or after a threshold number of remaining players is reached. In another embodiment, the player may use the bot for a portion of a hand and play a portion himself or herself.

Depending on the embodiment, besides the conventional input buttons associated with an online poker website, the poker game interface 400 may show all players whether other players or their bot is playing the current hand. Alternatively, whether a poker bot is playing remains confidential to the other players. Players may also use an auto-fold icon 410 to always fold to a poker bot bet.

Figure 6:
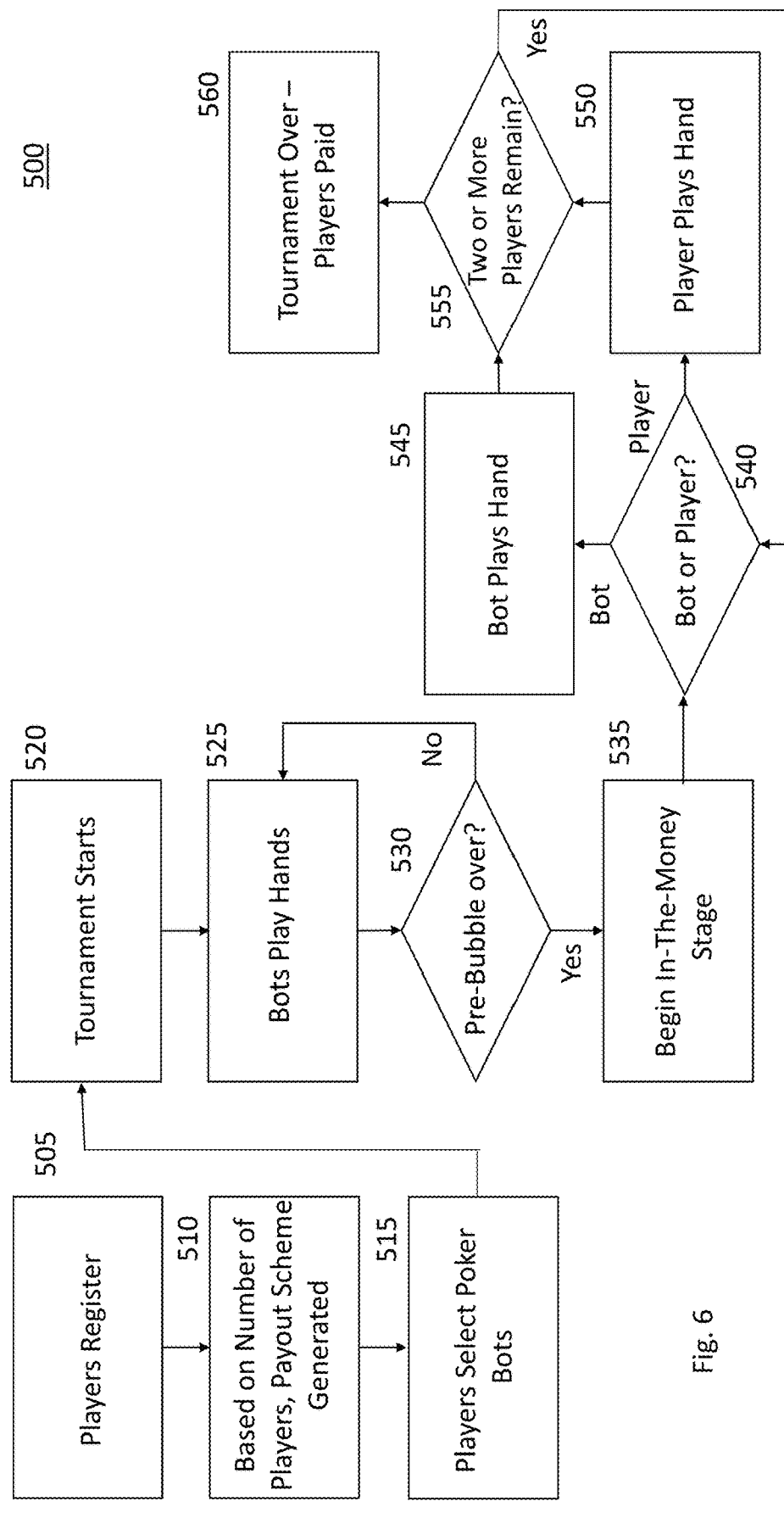
FIG. 6 illustrates a flow chart detailing one methodology of conducting a poker game tournament according to the embodiments of the present invention.

FIG. 6 shows a flow chart 500 detailing one methodology of the using the embodiments of the present invention in conjunction with a poker tournament. At 505, players register for the online tournament and pay their entry fees. At 510, based on the number of registrants, a payout scheme is generated. Conventionally, payouts are awarded to about the final 10% of players remaining in the tournament but the percentage can be increased or decreased by the operator as desired. At 515, players select their poker bots from a pool of poker bots. At 520, the poker tournament starts. At 525, selected poker bots play the hands exclusively. At 530, it is determined if the pre-bubble stage is over. If not, the chart 500 loops back to 525. If, at 530, it is determined that the pre-bubble stage has concluded, at 535, the in-the-money stage begins. At 540, players select bots or themselves to play the hands. At 545, selected bots play the hands and at 550, players play the hands. At 555, it is determined if two or more players remain. If so, the chart 500 loops back to 540. If not, at 560, the tournament ends and in-the-money stage players are paid their winnings.

Although the invention has been described in detail with reference to several embodiments, additional variations and modifications exist within the scope and spirit of the invention as described and defined in the following claims.

We claim:

1. A gaming system comprising:
one or more processors running executable instructions, said executable instructions involving, at least partially, rules for conducting one or more poker games;
said one or more processors configured to communicate with one or more remote computer devices, said remote computer devices each having at least a display for depicting said one or more poker games facilitated by said one or more processors and/or interface allowing players to make poker game inputs;
a plurality of poker bots; and
wherein said one or more processors are configured to: (i) manage a poker tournament having a pre-bubble stage and in-the-money stage; (ii) allow players of said poker tournament to select at least one poker bot from said plurality of poker bots or randomly assign to players of said poker tournament at least one poker bot from said plurality of poker bots; (iii) conduct said pre-bubble stage using exclusively said selected or randomly assigned poker bots; and (iv) conduct said in-the-money stage during which each player has the option to use a selected or randomly assigned poker bot or not use a selected or randomly assigned poker bot.

2. The gaming system of claim 1 wherein step (iv) is on a hand-by-hand basis.

3. The gaming system of claim 1 wherein said plurality of poker bots are stored in a database and/or maintained as non-fungible tokens.

4. The gaming system of claim 1 wherein said pre-bubble stage is displayed in a race view.

5. The gaming system of claim 1 wherein during step (iii) a number of times a poker bot may be used is limited.

6. The gaming system of claim 1 wherein each of the plurality of poker bots has different attributes.

7. The gaming system of claim 1 further comprising a digital toggle configured to permit a player turn on or turn off a poker bot during said in-the-money stage.

8. The gaming system of claim 7 wherein said digital toggle is inactive during said pre-bubble stage.

9. The gaming system of claim 7 wherein the plurality of poker bots are created from one master playing file.

10. The gaming system of claim 9 wherein said digital toggle is inactive during said pre-bubble stage.

11. A gaming system comprising:
one or more processors running executable instructions, said executable instructions involving, at least partially, rules for conducting one or more poker games;
said one or more processors configured to communicate with one or more remote computer devices, said remote computer devices each having at least a display for depicting a poker game facilitated by said one or more processors and/or interface allowing players to make poker game inputs;
a plurality of poker bots; and
wherein said one or more processors are configured to: (i) manage a poker tournament having a pre-bubble stage and in-the-money stage; (ii) provide access to one or more poker bots to each player in the poker tournament; (iii) conduct said pre-bubble stage using exclusively provided poker bots selected by each of said players or randomly assigned by said one or more processors from said plurality of poker bots; and (iv)

conduct said in-the-money stage during which each player has the option, via a digital toggle, to use a selected or randomly assigned poker bot or not use a selected or randomly assigned poker bot.

12. The gaming system of claim 11 wherein step (iv) is on a hand-by-hand basis.

13. The gaming system of claim 11 wherein said plurality of poker bots are stored in a database and/or maintained as non-fungible tokens.

14. The gaming system of claim 11 wherein said pre-bubble stage is displayed in a race view.

15. The gaming system of claim 11 wherein during step (iv) a number of times a provided poker bot may be used is limited.

16. The gaming system of claim 11 wherein each of the plurality of poker bots has different attributes.

17. The gaming system of claim 11 wherein the plurality of poker bots are created from one master playing file.

18. A gaming method comprising:
configuring one or more processors to run executable instruction for (i) conducting one or more poker games and (ii) communicate with one or more remote computer devices, said remote computer devices having at least a display for depicting said one or more poker games facilitated by said one or more processors and/or interface allowing players to make poker game inputs;
providing a plurality of poker bots; and
further configuring said one or more processors to: (i) manage a poker tournament having a pre-bubble stage and in-the-money stage; (ii) allow players of said poker tournament to select at least one poker bot from said plurality of poker bots or randomly assign to players of said poker tournament at least one poker bot from said plurality of poker bots; (iii) conduct said pre-bubble stage using exclusively said selected or assigned poker bots; and (iv) conduct said in-the-money stage during which each player has the option to use a selected or randomly assigned poker bot or not use a selected or randomly assigned poker bot.

19. The gaming method of claim 18 wherein step (iii) is on a hand-by-hand basis.

20. The gaming method of claim 18 further comprising storing said plurality of poker bots in a database and/or maintaining said plurality of poker bots as non-fungible tokens.

21. The gaming method of claim 18 further comprising displaying said pre-bubble stage in a race view.

22. The gaming method of claim 18 further comprising limiting a number of times a poker bot may be used during step (iii).

23. The gaming method of claim 18 further comprising providing each of said plurality of poker bots with different attributes.

24. The gaming method of claim 18 further comprising utilizing a digital toggle to permit a player turn on or turn off a poker bot during said in-the-money stage.

25. The gaming method of claim 24 further comprising inactivating said digital toggle during said pre-bubble stage.

26. The gaming method of claim 24 further comprising creating the plurality of poker bots from one master playing file.

* * * * *